Figure 1:
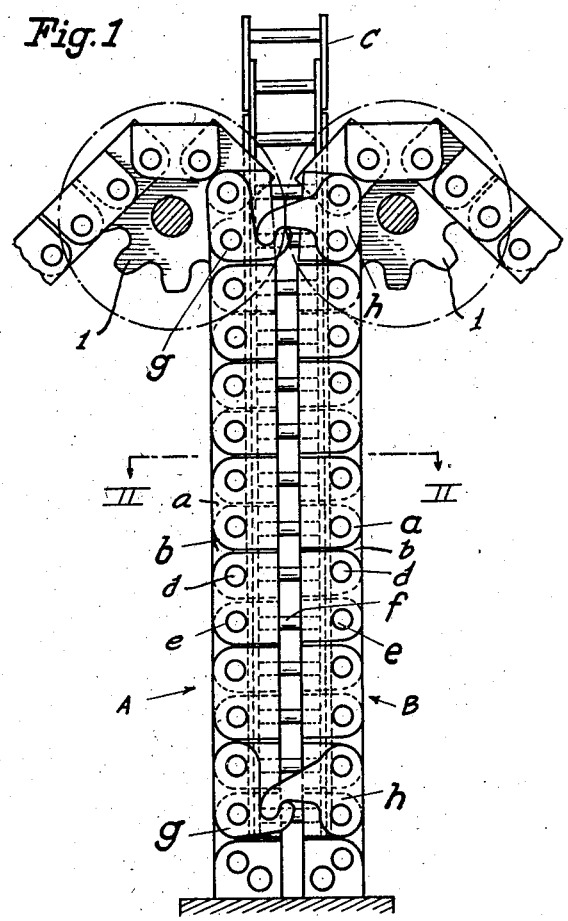

May 8, 1945.  K. BENDER  2,375,461
COMPRESSION RESISTANT CHAINS
Filed Sept. 29, 1941  3 Sheets-Sheet 1

Inventor:
Karl Bender
By: Mason & Porter
Attorneys

May 8, 1945.　　　　K. BENDER　　　　2,375,461
COMPRESSION RESISTANT CHAINS
Filed Sept. 29, 1941　　　3 Sheets-Sheet 2

Inventor:
Karl Bender
By: Mason & Porter
Attorneys

May 8, 1945.   K. BENDER   2,375,461
COMPRESSION RESISTANT CHAINS
Filed Sept. 29, 1941   3 Sheets-Sheet 3

Inventor:
Karl Bender
By: Mason & Porter
Attorneys

Patented May 8, 1945

2,375,461

UNITED STATES PATENT OFFICE 2,375,461

COMPRESSION RESISTANT CHAIN

Karl Bender, Wurzburg, Germany; vested in the Alien Property Custodian

Application September 29, 1941, Serial No. 412,904
In Germany March 27, 1937

14 Claims. (Cl. 189—34)

The present invention relates to improvements in compression resistant chains especially although not necessarily for use in the lifting gear of sluices, flood or lifting gates, mitred lock gates and the like, the said chains each comprising two oppositely acting flat link chains capable of being rolled up in the same plane.

For the operation of such gates and the like racks have been proposed, which consist of members pivoted to each other and which, when transmitting pressure, are rendered resistant against buckling by guides provided at least two points. This construction, however, has the drawback that such guides must be provided and that a compression resistant structure is present only as far as these guides extend.

It has also been suggested to produce a compression resistant lifting device composed of two oppositely acting link chains having links consisting of solid blocks which bear against each other over their entire length when the chains are wound up, but even this construction cannot be considered to be an ideal solution as the distance at which the pivot points in this structure are spaced from each other has, of necessity, to be rather small, so that the resultant profile has only a comparatively small moment of resistance against buckling.

According to the present invention a more favorable compression resistant structure of the type indicated is obtained by providing a compression resistant group consisting of two oppositely acting flat link chains and a third flat link chain arranged at right angles to and bearing against the two oppositely acting chains.

The chains may also be so constructed that the individual links of the two oppositely acting chains may be hook-shaped so as to interlock without directly bearing upon each other.

The manufacture of such groups of compression resistant flat link chains is relatively cheap, whereas the reliability of service and the resistance against buckling and compression are high.

According to a preferred construction of the invention the chains are composed of links whose lengths are multiples of the pitch of the chain pins. The middle axes of the pins are fixed to connecting links in such a manner that the connecting links extend about half the pitch of the pins beyond the centre links. Thereby a fork is formed into which engages the pivot pin of the next following middle link. These connecting links may be constructed as locking hooks which engage the oppositely arranged elongated chain pins and lock the chain. The locking hooks may be detachably connected to the middle links.

The middle chain preferably serves as a counter-bearing for the chain pins of the two cooperating chains so that disengagement of the chain pins from the teeth of the driving gears or of the reversing wheels is prevented.

In the accompanying drawings some constructions according to the invention are shown by way of example.

Figure 2:
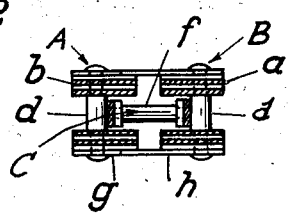
Figure 3:
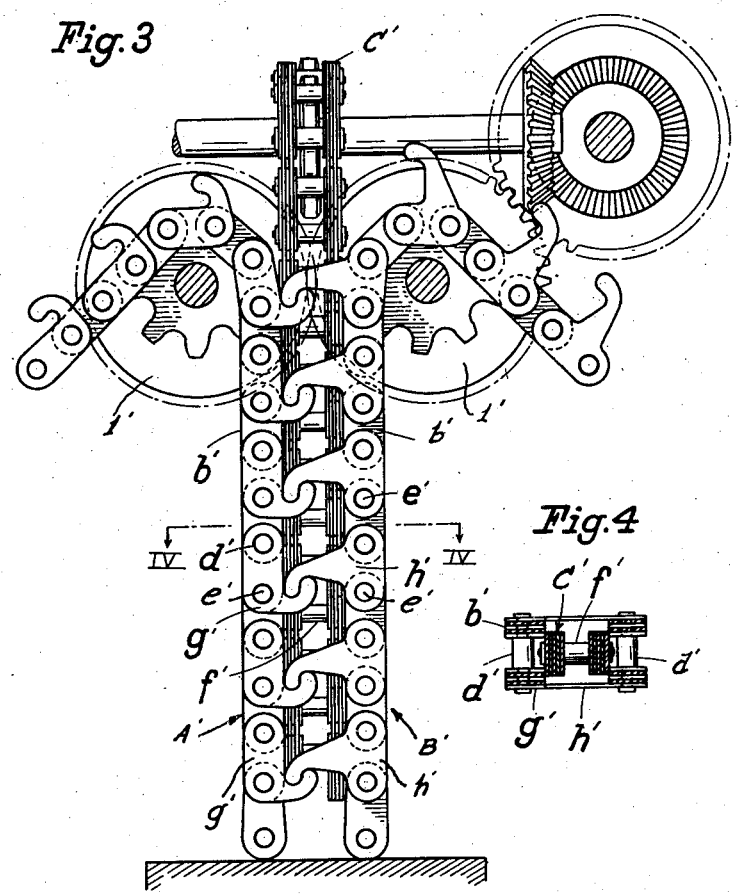
Figure 4:
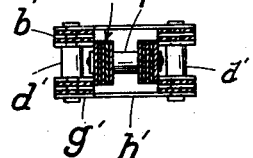
Figure 5:
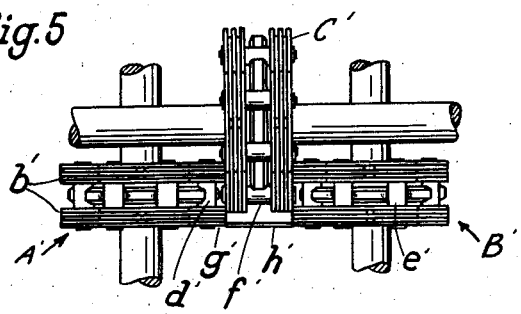
Figure 6:
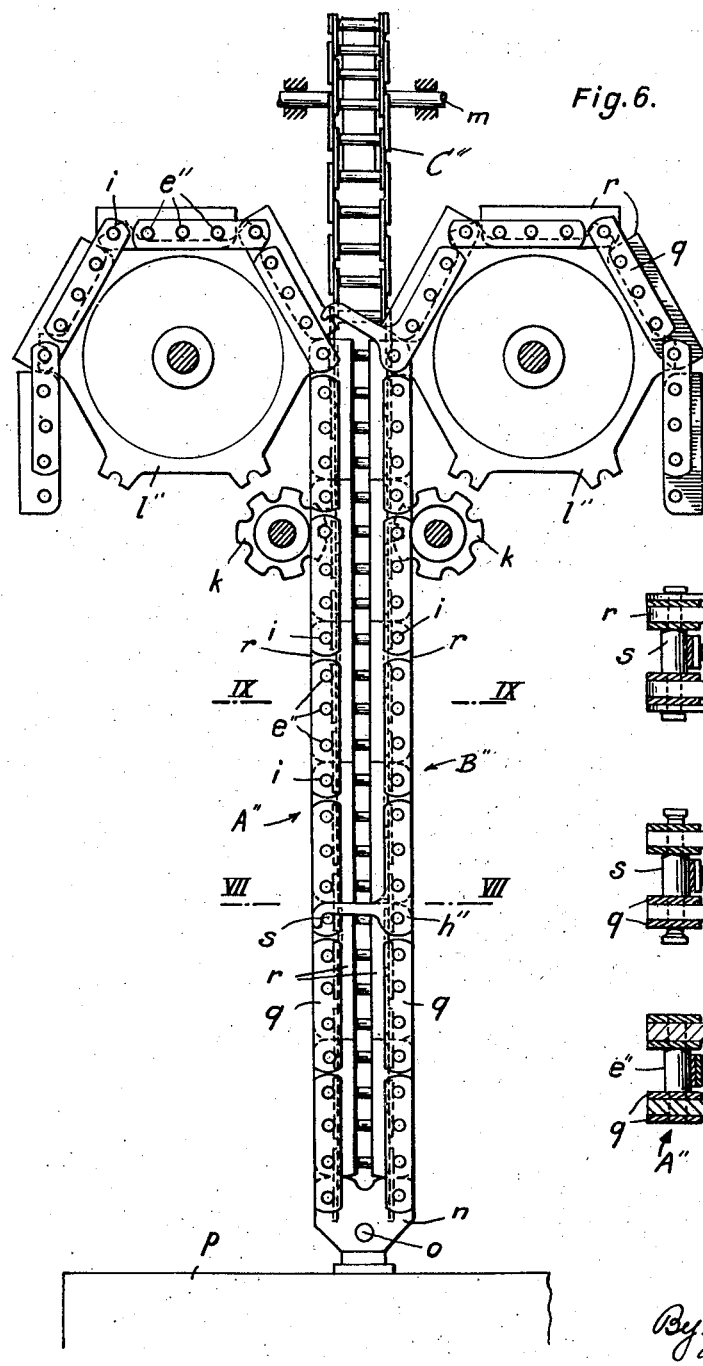
Figure 7:
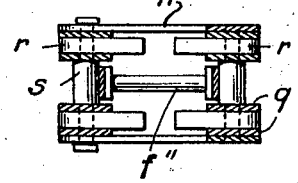
Figure 8:
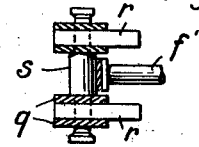
Figure 9:
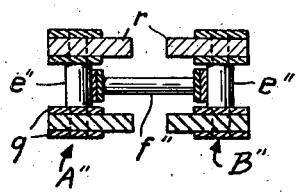

In these drawings:

Figure 1 shows a group of flat link chains in which the links of the two oppositely acting chains bear against each other, Fig. 2 is a cross section on line II—II of Fig. 1, Fig. 3 shows a modification, in which the links of the oppositely acting chains are interlocked without bearing against each other, Fig. 4 is a cross section on line IV—IV of Fig. 3, Fig. 5 is a plan view of the construction shown in Fig. 3, Fig. 6 shows a side elevation of another construction according to the invention, Fig. 7 is a section on line VII—VII of Fig. 6, Fig. 8 is a detail view on a somewhat larger scale, and Fig. 9 is a sectional on line IX—IX of Fig. 6.

Each group of chains consists of three flat link chains all of which are bolted to the body to be lifted. The two oppositely acting side chains are trained over individual sprocket driving wheels and constitute the lifting members proper of the lifting gear. The sprocket wheels of the two side chains are coupled by gears so that they are simultaneously driven with the same number of revolutions. The distance the two sprocket wheels are spaced from each other is so chosen that hook-shaped chain links on the side chains securely interlock as soon as they reach the vertical position after having moved over the sprocket wheels.

The third or middle chain operates between the side chains and is turned about 90° with respect thereto so that the links of the side chains come into contact with the links of the third chain and are pressed against the links thereof as soon as the hook-shaped links of the side chains come into engagement. If, however, narrower links are chosen for the third chain then the pins of the side chains will bear against the links of the middle chain instead of their links.

Upon the engagement of the side chains and middle chain a double cross section of I shape results which, when pressure is exerted thereupon, cannot deflect to any side and, therefore, is resistant against buckling.

Referring to Figures 1 and 2 of the drawings, the links a of the side chains A and B are so formed that the bores for the link pins d are not arranged in the middle of the links, but are spaced from the longitudinal edge of the links facing the sprocket wheels at the smallest distance consistent with sufficient strength of the links. The force acting upon the chain, is eccentrically applied. The lengths of the chain links are so dimensioned that in stretched condition of the chains the links are always in contact with each other. To render the chains movable towards one side only, the two inner edges of the links facing the sprocket wheel are rounded off at a radius corresponding to half the length of the inner edges of the links. The outer edges of the links are not so rounded, and when these outer edges engage the chains cannot buckle in the direction of the side of the chain at which the rounded-off edges are located.

The middle chain C operates between the two side chains A and B and is turned about 90° with respect thereto. For this purpose, however, a narrow chain comes into consideration, the links of which come into contact with the pins d of the side chains A and B. The outer ends of the pins f of the middle chain C are countersunk in the links.

After the chains A and B have passed over the sprocket wheels, an I-shaped cross section results as shown in Figure 2. Due to the eccentric arrangements of the pins of the links of the side chains A and B these chains cannot bulge outwardly when pressure is applied thereto. They are prevented from bulging inwardly by the presence of the middle chain C located between the chains A and B with its links bearing outwardly against the link pins d. In case of great chain lengths exposed to buckling, hook-shaped links g and h, similar to the links g' and h' shown in Figures 3-5, are provided, which are secured in a definite spaced relation to the eccentric links and at the outside of these links so that by the interengagement of such hook-shaped links the other links become in effect interlocked.

In the arrangement shown in Figures 3 to 5, the two oppositely acting side chains A' and B' are trained over the individual sprocket wheels l', l', which are coupled by gears so that they are driven with the same number of revolutions. The distance the two sprocket wheels are spaced from each other is chosen so that the hook-shaped side chain links g' and h' of which the side chains are composed, securely interlock as they reach the vertical position after having moved over the sprocket wheels.

The third or middle chain C' operates between the side chains A' and B' and is turned at an angle of 90° with respect thereto, so that the links of the side chains come into contact with the links of the middle chains C' and are pressed against the links thereof as soon as the hook-shaped links g' and h' of the side chains come into engagement. If, however, narrower links are chosen for the middle chain C' then the pins d' and e' of the side chains will bear against the links of the middle chain instead of their links.

Upon engagement of the side chains A' and B' and the middle chain C' a double cross section of I-shape results, as shown in Figure 4, which, when pressure is exerted thereon, cannot deflect toward any side and is rigid against buckling.

According to the preferred construction shown in Figs. 6 to 9 as small a number of individual links and pins as possible is used in order to reduce to a minimum the number of wearing parts of the chains and thereby to extend their usefulness. As may be seen from the drawings, the chain links consist of groups of elements each having a single middle link portion r of a thickness as great as possible and two connecting link portions q of less thickness. The length of the chain links, moreover, is calculated as a multiple of the pitch of the pins. One of the pins i provided as either the upper or lower pin of each link, is pivotally arranged in the end of the links, whereas the other pins e'' are fixed to the links and serve as driving pins. The chain links are unsymmetrically constructed. The bores for the reception of the pins are not arranged in the centre lines of the individual links but are spaced from the outer longitudinal edge of the links at the smallest distance consistent with the required strength of the links. On this outer side the links are rounded off as described above, whereas towards the inner edges of the links they are extended exactly half the pitch of the pins at right angles to the axis of the chain. In the stretched condition of the chain, it can bulge, as explained above, towards one side only. A further simplification of the chain compared to the construction already described is obtained by the fact that only the middle link portions r located between the symmetrically constructed inner and outer link portions q are unsymmetrically formed. The symmetrical inner and outer link portions q are fixed to the centre or middle link portions r and the parts of the link portions q having the bores receiving the chain pins i extend about half the pitch of the pins beyond the corresponding middle link portion r. Between these extended parts of the link portions q, the middle link portion r of the following chain link engages. Due to the outer link portions q being fixed to the middle link portion r, a safe guidance of the latter connected to the pivot pin i in the fork so formed is obtained and a lateral deflection or giving way of the middle link portions r of the entire chains A'' and B'' under compressive strain is excluded. Moreover, owing to this construction the middle link portions r must, in the stretched condition of the chain, positively occupy a position in a line extending parallel to the axis of the chain.

In an arrangement wherein the chains have links which can pivot under compressive strain about all chain pins, the middle link portions may be displaced in a vertical direction relatively to the chain pins, particularly if the latter are not snugly fitted or if wear of the pins or of the holes receiving them has occurred. Even after wear, this is impossible with the chain according to Figs. 6 to 9. If the connecting links extending to the middle link portions should connect only with the pins provided at the ends of the same, then here again two pivot points would be present between two middle or centre link portions, whereby the above mentioned drawbacks would be caused. As indicated, however, each two connecting links belonging together are rigidly connected to a centre link portion by a plurality of chain pins, so that between each two centre link portions one pivot point only is present i. e. in the end extending beyond the connecting links. Thereby all centre links of the chain are positively assured of being parallel to the axis of the chain in the stretched condition of the latter.

The two gears k engage the two chains A'' and B''. A disengagement of the chain pins from the gears $k$ is prevented by the middle chain $C''$ as the latter simultaneously forms the required counter bearing. After the chains $A''$ and $B''$ have passed the gears $k$, while moving upwardly, they are guided over the sprocket wheels $l''$. The pitch of the teeth of the sprocket wheels corresponds to the distance the pivot pins of the chain links are spaced from each other. The sprocket wheels $l''$ are so arranged above the gears $k$ that the pivot pins of the chains moving upwardly when engaging the related space between the teeth of the sprocket wheels are still pressed against the centre chain, whereby deflection or disengagement of the pins is prevented. At definite distances from each other the outer connecting links are provided with hooks $h''$ which, after engaging the opposite elongated chain pins $s$ mutually lock the chains $A''$ and $B''$, whereby, after the chains having passed the sprocket wheels, while moving downwardly, a rigid compression resistant unit is obtained below the gears $k$. A simplification of the locking arrangements described above is obtained by the fact that locking hooks are provided at definitely spaced distances from each other on one chain only, and only elongated chain pins $s$ engage the locking hooks $h''$ on the opposite chain instead of locking hooks.

Locking and releasing respectively of the chains $A''$ and $B''$ by the locking hooks $h''$ and the oppositely arranged elongated pins $s$ are effected during movement of the chains $A''$ and $B''$ toward and away from the sprocket wheels and not, as described above, at the lifting gears $k$. To ensure a uniform load on the chains $A''$ and $B''$ on lifting and compressing respectively, the lower ends of the chains $A''$ and $B''$ are pivotally connected to a compensating device $n$.

The middle chain $C''$ is connected to the body or member $p$ to be lifted at the point $o$ of application of the chains $A''$ and $B''$ and extends between the latter upwardly until the roller mounted on the shaft $m$ above the sprocket wheels $l''$ is reached. A relative displacement of the chains in the direction of the axis of the shaft $m$ is impossible.

The embodiments of the present invention, described herein by way of example in vertical position, may also be used in any other inclined position, for instance in connection with mitred lock gates of sluices and the like.

I claim:

1. A non-buckling chain system of the character described, comprising a pair of opposed chains, each chain comprising transverse sprocket engaging connecting pins and two sets of flat links positioned on the ends of the pins; a third chain positioned between the two opposed chains, said third chain comprising transverse sprocket engaging connecting pins and two sets of flat links positioned at the ends of the pins, the pins of the third chain being arranged substantially at right angles to the pins of the other chains, with the links of said third chain bearing against inwardly facing portions of the opposed chains so as to prevent the opposed chains from buckling inwardly, and said links of the opposed chains having means preventing outward buckling of the chains.

2. A non-buckling chain system according to claim 1 wherein said inwardly facing portions comprise the inner sides of the pins of the opposed chains.

3. A non-buckling chain system according to claim 1 wherein said inwardly facing portions comprise the inner edges of the flat links of the opposed chains.

4. A non-buckling chain system according to claim 1 wherein said means comprises cooperating end portions on adjacent links of the opposed chains said end portions being arranged to abut and prevent outward buckling of the opposed chains.

5. A non-buckling chain system according to claim 1 wherein said means comprises extensions on some of the links of the opposed chains, and hook elements formed on such extensions, the hook elements being arranged on the opposed chains to interengage and prevent inward and outward buckling of the opposed chains.

6. A non-buckling chain system according to claim 1 wherein said means comprises extensions on some of the links of the opposed chains, and hook elements formed on such extensions, the hook elements being arranged on the opposed chains to interengage and prevent inward and outward buckling of the opposed chains, said hook elements being provided on successive links of the opposed chains.

7. A non-buckling chain system according to claim 1 wherein said means comprises extensions on some of the links of the opposed chains, and hook elements formed on such extensions, the hook elements being arranged on the opposed chains to interengage and prevent inward and outward buckling of the opposed chains, said hook elements being provided on alternate links of the opposed chains.

8. A non-buckling chain system according to claim 1 wherein said means comprises extensions on some of the links of the opposed chains, and hook elements formed on such extensions, the hook elements being arranged on the opposed chains to interengage and prevent inward and outward buckling of the opposed chains, said hook elements being spaced along the opposed chains at substantial intervals embracing several links.

9. A non-buckling chain system according to claim 1 wherein the links of the opposed chains comprise a pair of spaced links and a relatively thick middle plate disposed between the spaced links, said spaced links and middle plate being secured together with one end of the spaced links longitudinally spaced from and exposing the corresponding end of the middle plate and with the opposite end of the spaced links projecting longitudinally beyond the corresponding end of the middle plate, the projecting ends of the spaced links of the chains extending on opposite sides of the exposed ends of the next middle plates and overlapping said exposed ends and pivoted to the exposed ends by some of said connecting pins.

10. A non-buckling chain system according to claim 1 wherein the links of the opposed chains comprise a pair of spaced links and a relatively thick middle plate disposed between the spaced links, said spaced links and middle plate being secured together with one end of the spaced links longitudinally spaced from and exposing the corresponding end of the middle plate and with the opposite end of the spaced links projecting longitudinally beyond the corresponding end of the middle plate, the projecting ends of the spaced links of the chains extending on opposite sides of the exposed ends of the next middle plates and overlapping said exposed ends and pivoted to the exposed ends by some of said connecting pins, said means comprising substantially squared end portions on the adjacent ends of said middle plates which abut in a stretched condition of the chains and prevent outward movement of any individual links.

11. A non-buckling chain system according to claim 1 wherein the links of the opposed chains comprise a pair of spaced links and a relatively thick middle plate disposed between the spaced links, said spaced links and middle plate being secured together with one end of the spaced links longitudinally spaced from and exposing the corresponding end of the middle plate and with the opposite end of the spaced links projecting longitudinally beyond the corresponding end of the middle plate, the projecting ends of the spaced links of the chains extending on opposite sides of the exposed ends of the spaced links of the chains extending on opposite sides of the exposed ends of the next middle plates and overlapping said exposed ends and pivoted to the exposed ends by some of said connecting pins, said means comprising extensions of the ends of some of the connecting pins and hooks formed on corresponding ones of the spaced links for engaging the extensions so as to prevent lateral buckling of the chains.

12. A non-buckling chain system according to claim 1 wherein the links of the opposed chains comprise a pair of spaced links and a relatively thick middle plate disposed between the spaced links, said spaced links and middle plate being secured together with one end of the spaced links longitudinally spaced from and exposing the corresponding end of the middle plate and with the opposite end of the spaced links projecting longitudinally beyond the corresponding end of the middle plate, the projecting ends of the spaced links of the chains extending on opposite sides of the exposed ends of the next middle plates and overlapping said exposed ends and pivoted to the exposed ends by some of said connecting pins, the said facing portions of the opposed chains comprising the surfaces of the connecting pins between the inner ones of said spaced links.

13. A non-buckling chain system according to claim 1 wherein the links of the opposed chains comprise a pair of spaced links and a relatively thick middle plate disposed between the spaced links, said spaced links and middle plate being secured together with one end of the spaced links longitudinally spaced from and exposing the corresponding end of the middle plate and with the opposite end of the spaced links projecting longitudinally beyond the corresponding end of the middle plate, the projecting ends of the spaced links of the chains extending on opposite sides of the exposed ends of the next middle plates and overlapping said exposed ends and pivoted to the exposed ends by some of said connecting pins, some of the said connecting pins being fixedly spaced along the said links besides the connecting pins acting as pivots, thereby providing sprocket engaging means.

14. A non-buckling chain system according to claim 1 wherein the links of the opposed chains comprise a pair of spaced links and a relatively thick middle plate disposed between the spaced links, said spaced links and middle plate being secured together with one end of the spaced links longitudinally spaced from and exposing the corresponding end of the middle plate and with the opposite end of the spaced links projecting longitudinally beyond the corresponding end of the middle plate, the projecting ends of the spaced links of the chains extending on opposite sides of the exposed ends of the next middle plates and overlapping said exposed ends and pivoted to the exposed ends by some of said connecting pins, and compensating means to which a terminal end of the chain system is anchored, said compensating means comprising a stationary element fixed to the object to be lifted or pulled, a movable element pivoted to the stationary element on an axis substantially parallel to the connecting pins of the opposed chains, the terminal ends of the opposed chains being pivoted to opposite sides of said movable element and the said third chain being connected to said stationary element.

KARL BENDER.